United States Patent [19]
Gomez et al.

[11] Patent Number: 5,545,971
[45] Date of Patent: Aug. 13, 1996

[54] AC VOLTAGE REGULATOR

[76] Inventors: Zaitter Gomez, Cra. 36, No. 70-35, A.A. 89871, Santafe de Bogota, D.C.; Mario A. Gongora, P.O. Box 25.0931, Bogota D.C., both of Colombia

[21] Appl. No.: 456,672

[22] Filed: Jun. 1, 1995

[51] Int. Cl.$^6$ ..................................................... G05F 1/24
[52] U.S. Cl. ............................ 323/259; 323/263; 363/90
[58] Field of Search ..................................... 323/301, 247, 323/259, 263; 363/84, 90, 91

[56] References Cited

U.S. PATENT DOCUMENTS

| | | | |
|---|---|---|---|
| 3,621,374 | 11/1971 | Kettler | 323/43.5 S |
| 5,018,058 | 5/1991 | Ionescu et al. | 363/64 |
| 5,311,419 | 5/1994 | Shires | 363/65 |

*Primary Examiner*—Peter S. Wong
*Assistant Examiner*—Bao Q. Vu

*Attorney, Agent, or Firm*—Malloy & Malloy, P.A.

[57] ABSTRACT

An AC voltage regulator to be used to regulate voltage fluctuations both above and below a desired voltage output, the regulator including a regulator input connected with an AC power source, a regulator output connected with a load, and a single regulator transformer having a power winding and an inducing winding. The power winding is connected in series between the regulator input and the regulator output and the inducing winding, which is generally electrically isolated from the power winding, is structured and disposed to selectively induce a low voltage on the power winding. Further, a plurality of high frequency AC switches are included so as to variably set a plurality of connection topologies, each connection topology being specifically structured either to maintain voltage passing through the regulator constant, to step-up the voltage or to step-down the voltage, the various switches being variably positionable to provide for precise, gradual regulated adjustment of the output voltage.

15 Claims, 1 Drawing Sheet

AC VOLTAGE REGULATOR

BACKGROUND OF THE INVENTION

1. Field of the Invention

The present invention relates to an AC voltage regulator to be placed between an AC voltage power source, such as a utility line, and its load, so as to regulate the voltage supplied to the load independent of the variations of the line voltage above or below a desired output, within a predetermined range, and to be substantially compact, efficient and economical to use.

2. Description of the Related Art

AC power voltage sources are frequently subjected to variations from their desired output voltage due to numerous common factors. For example, the demand of multiple loads, the impedance of the transmission lines, changes in average power demands over time, along with various other factors can cause the voltage output from the source to fluctuate, both above and below the desired output, before reaching the load. As a result, these variations can seriously affect the electrical devices connected thereto. In particular, many delicate industrial machines or electronic equipment, which are difficult and expensive to repair and/or replace, are highly susceptible to the adverse effects of voltage fluctuations. Accordingly, voltage regulators are often utilized in an attempt to stabilize the voltage output and bring it closer to the desired voltage output for the particular load.

Most prior art tap-changer AC voltage regulators utilize a small number of discrete steps in a tapped auto-transformer to correct changes in the voltage level of the AC power source. These corrections, however, are merely coarse corrections because discrete steps must be taken. Further, because of size constraints of the regulator, only a few discrete steps are available, thereby limiting a variation of the output to a small range of values and/or allowing significant variation between steps. Additionally, because the taps are switched at the power section of the windings, the power dissipation in the switching devices will greatly impair the efficiency of the regulator and limit the power that it can handle.

Accordingly, others in the art have turned to using switches at secondary windings, in what had been referred to as "phasorial" or "vectorial" AC voltage regulators. In these devices each of the switches handles five or six times less power than the tap-changer regulator for the same output power level. Nevertheless, while the taps are switched at the low power section, a large amount of secondary winding is needed to fulfill the full range necessary. This requirement makes these types of regulators very bulky and limits the number of possible steps. Additionally, voltage levels induced in the secondary winding puts considerable stress on the switching devices which therefore limits the line voltage levels for which the device can be practically used. Accordingly, there is still a need for a voltage regulator which is substantially compact and can handle a broad range of voltage variations efficiently and cost effectively.

More recently, AC switching regulators, as recited in the patents to McGuire (U.S. Pat. No. 4,745,352 and 4,791,348) which uses a single tap auto-transformer, have been implemented. These regulators, which switch at high frequency in PWM mode part of their winding between two predetermined points, and filter the output, can obtain a controllable average voltage at that output. In such systems, however, the AC voltage must either be boosted (step-up), thus correcting AC power variations below the specified required output values, or be stepped-down, thus correcting variations above the specified desired voltage output. Accordingly, a user is forced to select which side of the variation is most likely to occur and must implement the corresponding device, a decision that can be quite costly if improperly made. Further complicating the decision, in many circumstances the voltage can fluctuate both above and below the specified desired output. Therefore, to ensure safety in such circumstances, there are two alternatives, either to utilize two regulators, one in a stepping-up mode and another in a stepping-down mode, a configuration which may not be practical, doubles the costs, requiring two full power transformers, and can be quite bulky, or use a stepping-up transformer and a stepping-down regulator, both with twice the range, also an alternative that impractical and can even be dangerous for the user.

As a result, there is still a substantial need in the art for a voltage regulator which will accurately and effectively regulate the voltage output to a specified desired voltage output, is not substantially bulky or substantially expensive, and is capable of providing the necessary adjustments for voltage levels above or below the desired output utilizing only a single transformer.

SUMMARY OF THE INVENTION

The present invention is directed to an AC voltage regulator, which provides a load with a specific desired voltage output. The regulator includes a regulator input, which is connected with an AC power source, and a regulator output, which is connected with the load. Further, a regulator transformer having a first and second winding is also included. In particular, the first and second windings are electrically isolated from one another, within the transformer, with the first winding being a power winding that is connected in series between the regulator input and the regulator output. The second winding is an inducing winding and is structured and disposed to induce a low voltage on the power winding in order to correspondingly increase or decrease an output voltage.

Connected with the inducing winding are a plurality of high frequency AC switches. These high frequency AC switches are structured and disposed to be variably set in one of a plurality of connection topologies as set by electronic control means. The electronic controls means are structured and disposed to monitor an input voltage from the AC power source at the regulator input, and the output voltage which exits the regulator output to the load, such that it can variably control the state of each of the high frequency AC switches. The adjusted position of each of the high frequency AC switches sets a select one of the connection topologies, with each of the connection topologies resulting in an appropriate modification of the output voltage. By alternating at high frequency between two different topologies, a desired output voltage can be obtained.

It is an object of the present invention to provide an AC voltage regulator which will efficiently and finely regulate the output voltage regardless of the variations of the AC power source or the load, in a range including values below, equal to and above the desired output voltage.

Still an object of the present invention is to provide an AC voltage regulator which can regulate voltages above, below and equal to the desired output voltage, finely and efficiently, while using only one small and simple transformer.

Yet another object of the present invention is to provide an AC voltage regulator which can provide for voltage regulation whether or not the input voltage is above or below the desired output voltage, and which uses a single transformer so as to minimize a size, heat output, complexity and cost of the voltage regulator.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
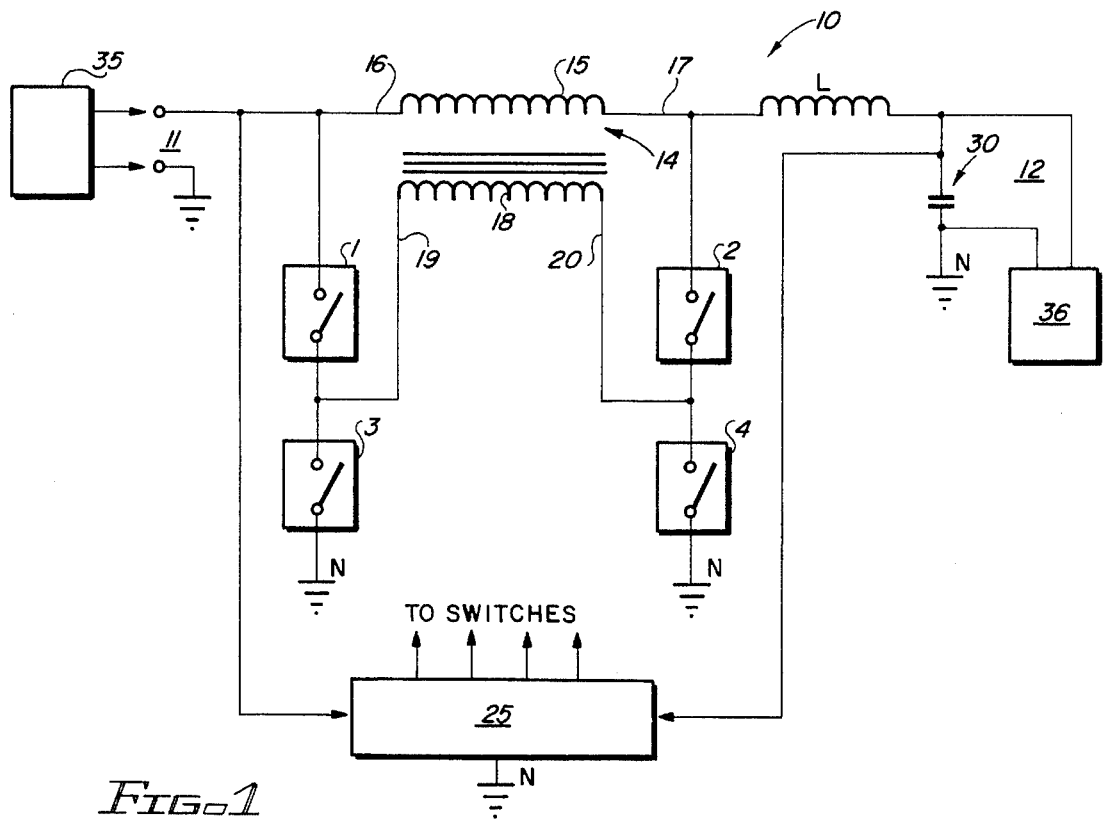
FIG. 1 is a detailed wiring diagram of the AC voltage regulator circuit.

Shown throughout the figures, the present invention is directed toward an AC voltage regulator, generally indicated as 10. The AC voltage regulator 10 is structured to appropriately adjust a voltage output so as to provide a predetermined desired output voltage for use by the specific load connected to an AC power source through the AC voltage regulator 10 of the present invention. Turning specifically to the AC voltage regulator 10, as illustrated in the accompanying wiring diagram, it will include a regulator input 11 and regulator output 12. The regulator input 11 is to be connected with the AC power source 35 in any conventional manner such that current exiting the AC power source 35 must enter the voltage regulator 10 therethrough. Similarly, the regulator output 12 is connected to the load 36 such that current drawn from the AC power source 35 and exiting the voltage regulator 10 must pass therethrough for use by the load 36.

The voltage regulator 10 of the present invention also includes a single regulator transformer 14 which provides the appropriate voltage regulation. In particular, the regulator transformer 14 will include a first winding 15 and a second winding 18. The first winding 15 is a power winding and is connected in series between the regulator input 11 and the regulator output 12, such that the current will pass therethrough upon passage from the regulator input 11 to the regulator output 12. The second winding 18 is an inducing winding which is electrically isolated from the power winding 15, but nonetheless is structured and disposed to induce a low voltage on the power winding 15. The power winding 15 will preferably be capable of handling an induced low voltage equal to one half of the range of operation of the overall voltage regulator 10. Accordingly, the amount that can be induced is equal to the maximum value which voltage fluctuations from the AC power source 35 can vary either above or below the desired voltage output. The variation range can be anything depending on the application, and for not critical cases it can be above 20 Volts AC or below the nominal line voltage.

Further included in the AC voltage regulator 10 are a plurality of high frequency AC switches. The high frequency AC switches are connected with the inducing winding 18 and are structured and disposed to be variably set in one of a plurality of connection topologies that selectively set the connection of the inducing winding 18. Preferably, high frequency switching is utilized to regulate the output because of its high efficiency and the ease with which the output voltage can be filtered, and to have a very precise output value using high resolution PWM (Pulse Width Modulation) in the switching. As such, many present art switch arrangements such as a MOSFET, IGBT or bi-polar transistors connected to the positive and negative terminals of a diodes full bridge, or a pair of MCTs with a pair of diodes, as well as any other high frequency power bi-lateral switch that presently exists (such as two MCTs in antiparallel) or may be developed can be effectively utilized within the voltage regulator 10 of the present invention.

In order to provide the number of individual topologies which are necessary for the appropriate voltage regulation, the present voltage regulator 10 preferably includes four of the high frequency switches, 1, 2, 3, and 4. These four switches 1,2,3 and 4 are connected in an H-bridge topology with the inducing winding 18 connected in a middle of the H-bridge. As illustrated in the figure, a first switch 1 is to be connected between an input end 16 of the power winding 15 and a first end 19 of the inducing winding 18. Similarly, the second switch 2 is connected between the output end 17 of the power winding 15 and a second end 20 of the inducing winding 18. The third switch 3 is preferably connected between the first end 19 of the inducing winding 18, and a common return, generally indicated N. As such, the first end 19 of the inducing winding 18 is essentially connected between the first and third switches 1 and 3. Similarly, the forth switch 4 is connected between the second end 20 of the inducing winding 18 and a common return N so as to connect the second end 20 of the inducing winding 18 between the second and fourth switches 2 and 4. With this particular H-bridge topology, a number of different topologies directed to provide the appropriate voltage regulation can be achieved.

A first of the connection topologies to be achieved is a step-up topology which will increase a voltage passing through the power winding 15 so as to increase the output voltage. This step-up topology includes one end of the inducing winding 18 connected with the input end 16 of the power winding 15 and an opposite end of the inducing winding 18 connected with a common return N. As such, in order to achieve this step-up topology switch 2 will be opened, switch 4 will be closed, switch 1 will be closed, and switch 3 will be open, thereby appropriately inducing the increased voltage at the power winding 15.

A second connection topology to be implemented is a step-down topology which is structured to decrease the voltage passing through the power winding 15 so as to decrease the output voltage. This step-down topology includes one end of the inducing winding 18 connected with the output end 17 of the power winding 15 and an opposite end of the inducing winding 18 connected with a common return N. Accordingly, to achieve the step-down topology, utilizing the H-bridge topology, switch 1 will be opened, switch 3 will be closed, switch 2 will be closed and switch 4 will be open, thus connecting the first end 19 of the inducing winding 18 with the common return N and the second end 20 of the inducing winding 18 with the output end 17 of the power winding 15.

Finally, a short circuit topology may also be configured. This short circuit topology includes the inducing winding 18 connected in short circuit so as to be completely isolated from the power winding 15 and thereby ensure that the voltage passing through the power winding 15 remains constant and does not increase or decrease unnecessarily. Utilizing the H-bridge topology, the short circuit topology is achieved by maintaining the first and second switches in an open configuration and positioning the third and fourth switches in a closed configuration.

Also included in the voltage regulator 10 of the present invention are control means in the form of an electronic control circuitry 25. This control circuitry 25 monitors an input voltage entering at the regulator input 11 from the AC power source 35, and an output voltage exiting to the load 36 at the regulator output 12. Accordingly, the control circuitry 25 compares the input and output voltages to the desired output voltage and correspondingly controls the specific position of each of the high frequency switches 1, 2, 3, 4 so as to select an appropriate one of the connection topologies. As such, the output voltage can be controlled by alternating between two of the three available topologies at high frequency and using PWM until the output voltage substantially equals a predetermined desired output voltage.

In circumstances wherein the voltage is to be increased in order to reach the predetermined desired output voltage, the control circuitry 25 will alternate the first and third switches between their open and closed positions, while keeping switch 4 closed (on) and switch 2 open (off). Therefore, when the first switch 1 is closed and the third switch 3 remains open the step-up topology is achieved and a voltage increase in the power winding 15 will result. When, however, the first switch 1 is open and the third switch 3 is closed, the short circuit topology is achieved and no further voltage increase at the power winding results. Accordingly, by variably alternating the state of the first and third switches 1 and 3, the voltage can be gradually and precisely increased until the predetermined desired output voltage is achieved as sampled by the control circuitry 25.

Similarly, when the output voltage need to be lowered in order to achieve the desired output voltage, the control circuitry 25 alternates the second and fourth switches two and four between their open and closed orientations, while keeping switch 3 closed and switch 1 open, so as to provide for effective, controlled lowering of the voltage in the power winding 15. Accordingly, when the second switch 2 is closed and the fourth switch 4 is open the step down topology is achieved to lower the voltage, but when the fourth switch 4 is closed and the second switch 2 is open the short circuit topology is achieved to maintain the voltage output constant. Therefore the voltage decrease can be gradually and precisely adjusted.

Also optionally included with voltage regulator 10 of the present invention 10 are filtration means utilized to eliminate the high frequency components at the output so as to have a 60 Hz wave form on the load. In particular, the filter will be disposed at the regulator output 12 and preferably will include a capacitor 30, disposed at the regulator output 20, which acts with the parasitic inductance of the regulator transformer, which has been graphically depicted as L, so as to function as a filter. Additionally, the regulator 10 can preferably include an EMI-RFI filter at the input (not shown for simplicity), as well as an AC crowbar (preferably TRIAC instead of SCR, also not shown for simplicity) structured to guarantee a physical disconnection from the load 36 as a fail-safe feature of the regulator 10 in case other parts of the control circuitry 25 fail.

Figure 2:
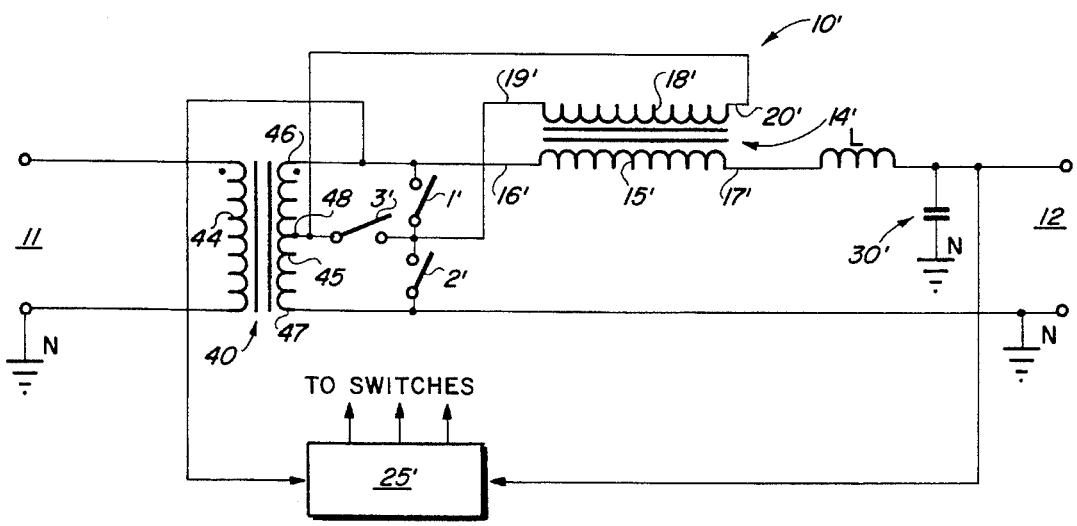
FIG. 2 is a detailed wiring diagram of an alternative embodiment of the AC voltage regulator circuit.

Further, in an alternative embodiment, because it is desirable and sometimes mandatory to have the output be completely electrically isolated from its input, an isolating transformer 40 may be included. As illustrated in FIG. 2, the alternative embodiment includes the isolating transformer 40 connected between the regulator input 11 and the regulator transformer 14'. The isolating transformer includes a primary winding 44, which is connected directly with the regulator input 11, and a secondary winding 45. The ratio between the windings 44 and 45 of the isolating transformer 40 is preferably 1:1, as the isolating transformer 42 is structured primarily to isolate the regulator transformer 14' from the regulator input 11 rather than to provide some voltage regulation.

The secondary winding 45 includes a top end 46, a bottom end 47, and a tap point 48. The top end 46, from which the exiting voltage is equivalent to the input voltage, is connected primarily with the input end 16' of the power winding 15' of the regulator transformer 14'. Conversely, the bottom end 47 of the secondary winding 45 is connected with a common return N. Finally, the tap point 48 of the secondary winding 45 is connected primarily with the second end 20' of the inducing winding 18'. Disposed between these various connections, as illustrated in FIG. 2 are the series of preferably three high frequency switches 1' 2' and 3'. The third switch 3' is connected between the tap point 48 of the secondary winding 45 and the first end 19' of the inducing winding 18', the first switch 1' is connected between the first end 19' of the inducing winding 18' and the connection between the top end 46 of the secondary winding 45 and the input end 16' of the power winding 15', and the second switch 2' is connected between the first end 19' of the inducing winding 18' and the connection between the bottom end 47 of the secondary winding 45 and the common return N. It is noted, however, that the tap point 48 can be anywhere along the secondary winding 45 depending upon the operating conditions, and additional coil for the secondary winding can be added with only minor modification.

As with the previous embodiment, the control circuitry 25 samples the input voltage and the output voltage so as to accordingly regulate the topology created by the switches 1', 2', and 3'. In circumstances where the input voltage is appropriate, a short circuit topology is achieved by closing the third switch 3' and maintaining the first and second switches 1' and 2' open. As such, the voltage level at both sides of the inducing winding 18' is equivalent and no increase or decrease in the voltage level through the power winding 15' is achieved.

Alternatively, when the input voltage is low and the voltage needs to be increased, the control circuitry initiates a step-up topology wherein the second switch 2' is constantly maintained open and the first and third switches 1' and 3' are alternated between an open and closed state. As such, when the third switch 3' is closed and the first switch 1' is open the short circuit topology is achieved, but when the third switch 3' is open and the first switch 1' is closed the voltage at the first end 19' of the inducing winding 18' is greater than at the second end 20' of the inducing winding 18' such that a step up voltage is induced in the induction winding 18'.

Conversely, when the input voltage is high and the voltage needs to be decreased, the control circuitry initiates a step-down topology wherein the first switch 1' is constantly maintained open and the second and third switches 2' and 3' are alternated between an open and closed state. As with the step up topology, when the third switch 3' is closed and the second switch 2' is open the short circuit topology is achieved, but when the third switch 3' is open and the second switch 2' is closed the voltage at the first end 19' of the inducing winding 18' is lower than at the second end 20' of the inducing winding 18' such that a step down voltage is induced in the induction winding 18'.

Finally, as with the previous embodiment, the output end 17' of the power winding 15' is connected with the regulator output 12 either directly or through a filter 30.

It should also be noted that the recited preferred embodiments of the voltage regulator of the present invention can be effectively and easily converted for use as a very precise, electronically controlled solid state AC variator, or AC variable power supply. Such devices are very useful for types of laboratory testing procedures, and the device can be simply converted by connecting the power supply to the regulator output 20 and adding an external manual setting control to the electronic control circuitry 21.

While this invention has been shown and described in what is considered to be a practical and preferred embodiment, it is recognized that departures may be made within the spirit and scope of this invention which should, therefore, not be limited except as set forth in the claims which follow and within the doctrine of equivalents.

Now that the invention has been described,
What is claimed is:

1. An AC voltage regulator comprising:
   a regulator input, said regulator input being connected with an AC power source,
   a regulator output, said regulator output being connected with a load,
   a regulator transformer, said regulator transformer including a first winding and a second winding which are electrically isolated with one another,
   said first winding being a power winding and being connected between said regulator input and said regulator output,
   said second winding being an inducing winding which induces a low voltage on said power winding,
   a plurality of high frequency switches connected with said inducing winding and structured to variably and selectively isolate said inducing winding, and
   means to monitor an input voltage from said AC power source at said regulator input and an output voltage exiting said regulator output to the load, and to variably control a conductive posture of each of said high frequency AC switches in order to selectively vary conductive contact of said inducing winding and thereby selectively vary whether said inducing winding increases, decreases, or maintains voltage passing through said power winding.

2. An AC voltage regulator as recited in claim 1 further including a capacitor disposed at said regulator output which is structured to act as a filter with a parasitic inductance of said regulator transformer.

3. An AC voltage regulator as recited in claim 1 wherein said plurality of high frequency AC switches are disposed to selectively connect one end of said inducing winding with an input end of said power winding and an opposite of said inducing winding to a common return such that said inducing winding increases a voltage passing through said power winding in order to increase the output voltage.

4. An AC voltage regulator as recited in claim 3 wherein said plurality of high frequency AC switches connect said inducing winding in short circuit with a common return so as to be completely electrically isolated from said power winding and maintain the voltage passing through said power winding unaffected.

5. An AC voltage regulator as recited in claim 4 wherein said plurality of high frequency AC switches connect said one end of said inducing winding with an output end of said power winding and said opposite end of said inducing winding to said common return so as to decrease the voltage passing through said power winding and thereby decrease the output voltage.

6. An AC voltage regulator as recited in claim 1 wherein there are at least four of said high frequency AC switches connected in an H-Bridge topology with said inducing winding connected in a middle of said H-Bridge topology.

7. An AC voltage regulator as recited in claim 6 wherein said H bridge topology includes:
   a first switch connected between said input end of said power winding and a first end of said inducing winding,
   a second switch connected between said output end of said power winding and a second end of said inducing winding,
   a third switch connected between said first end of said inducing winding and a common return, and
   a fourth switch connected between said second end of said inducing winding and said common return.

8. An AC voltage regulator as recited in claim 7 wherein said control means are structured to alternate said conductive posture of said first and said third switches so as to precisely increase said output voltage to said predetermined desired output voltage, and to alternate said conductive posture of said second and said fourth switches so as to precisely decrease said output voltage to said predetermined, desired output voltage.

9. An AC voltage regulator as recited in claim 1 further including an isolation transformer disposed between said regulator input and said regulator transformer.

10. An AC voltage regulator as recited in claim 9 wherein said isolation transformer includes a primary winding, which is connected directly with the regulator input, and a secondary winding, said secondary winding including a top end, a bottom end, and a tap point.

11. An AC voltage regulator as recited in claim 10 wherein said top end of said secondary winding is connected primarily with an input end of said power winding of said regulator transformer, said bottom end of said secondary winding is connected with a common return, and said tap point of said secondary winding is connected primarily with a second end of said inducing winding.

12. An AC voltage regulator as recited in claim 11 further including three of said high frequency AC switches.

13. An AC voltage regulator as recited in claim 12 wherein a first of said switches is connected between a first and of said inducing winding and a connection between said top end of said secondary winding and said input end of said power winding, a second of said switches is connected between said first end of said inducing winding and a connection between said bottom end of said secondary winding and said common return, and a third of said switches is connected between said tap point of said secondary winding and said first end of said inducing winding.

14. An AC voltage regulator comprising:
    a regulator input, said regulator input being connected with an AC power source,
    a regulator output, said regulator output being connected with a load,
    a regulator transformer, said regulator transformer including a first winding and a second winding which are electrically isolated from one another,
    said first winding being a power winding and being connected between said regulator input and said regulator output,
    said second winding being an inducing winding which selectively induces a low voltage on said power winding,
    a plurality of high frequency AC switches connected with said inducing winding in a generally H bridge topology with said inducing winding connected in a middle of said H bridge topology, a first of said high frequency AC switches connected between said input end of said power winding and a first end of said inducing winding, a second of said high frequency switches connected between said output end of said power winding and a second end of said inducing winding, a third of said high frequency switches connected between said first end of said inducing winding and a common return, a fourth of said high frequency switches connected between said second end of said inducing winding and said common return, and means to monitor an input voltage from said AC power source at said regulator input and an output voltage exiting said regulator output to the load, and variably control a conductive posture of said high frequency switches so as to selectively vary whether said inducing winding increases, decreases, or maintains the voltage passing through said power winding, and accordingly, increases, decreases or maintains the output voltage.

15. An AC voltage regulator comprising:

a regulator input, said regulator input being connected with an AC power source, a regulator output, said regulator output being connected with a load, a regulator transformer, said regulator transformer including a first winding and a second winding which are electrically isolated from one another, said first winding being a power winding and being connected between said regulator input and said regulator output, said second winding being an inducing winding which induces a low voltage on said power winding, an isolation transformer disposed between said regulator input and said regulator transformer, said isolation transformer including a primary winding, which is connected directly with said regulator input, and a secondary winding, said secondary winding including a top end and a bottom end, and a tap point, said top end of said secondary winding being connected primarily with an input end of said power winding of said regulator transformer, said bottom end of said secondary winding being connected with a common return, said tap point of said secondary winding being connected primarily with a second end of said inducing winding, at least three high frequency AC switches, a first of said high frequency switches connected between a first end of said inducing winding and a connection between said top end of said secondary winding and said input end of said power winding, a second of said high frequency switches connected between said first end of said inducing winding and a connection between said bottom end of said secondary winding and said common return, a third of said switches connected between said tap point of said secondary winding and said first end of said inducing winding, and means to monitor an input voltage from said AC power source at said regulator input and an output voltage exiting said regulator output to the load, and variable control a conductive posture of said high frequency AC switches in order to variably increase, decrease, or maintain the output voltage.

\* \* \* \* \*